(12) United States Patent
Ohtsuka

(10) Patent No.: US 6,574,009 B1
(45) Date of Patent: Jun. 3, 2003

(54) METHOD AND APPARATUS FOR VERIFYING ORDER INFORMATION AND RECORDING MEDIUM STORING ORDER INFORMATION VERIFICATION PROGRAM

(75) Inventor: Shuichi Ohtsuka, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/235,634

(22) Filed: Jan. 22, 1999

(30) Foreign Application Priority Data

Jan. 22, 1998 (JP) .......................................... 10-010359

(51) Int. Cl.⁷ .............................................. G06F 13/00
(52) U.S. Cl. ..................... 358/1.18; 358/1.14; 358/1.15
(58) Field of Search ................. 358/1.12, 1.13, 358/1.14, 1.15, 1.17, 1.18, 405, 487, 506; 355/84

(56) References Cited

U.S. PATENT DOCUMENTS 5,808,894 A * 9/1998 Wiens et al. ........... 364/479.01

* cited by examiner

Primary Examiner—Mark Wallerson
(74) Attorney, Agent, or Firm—Birch, Stewart, Kolasch & Birch, LLP

(57) ABSTRACT

An invalid order is prevented from being placed by verifying the appropriateness of order information describing the content of the order for a service as digital data. In the case where a condition to be satisfied by the order information is changed, a flexible and prompt response can be realized. A condition definition file defining a condition to be satisfied by the order information is pre-stored in a recording medium and verification of an order file is carried out by referring to the condition definition file. When a change occurs in an order information format or the like, a program to execute the verification processing does not change, while only the condition definition file is replaced.

16 Claims, 3 Drawing Sheets

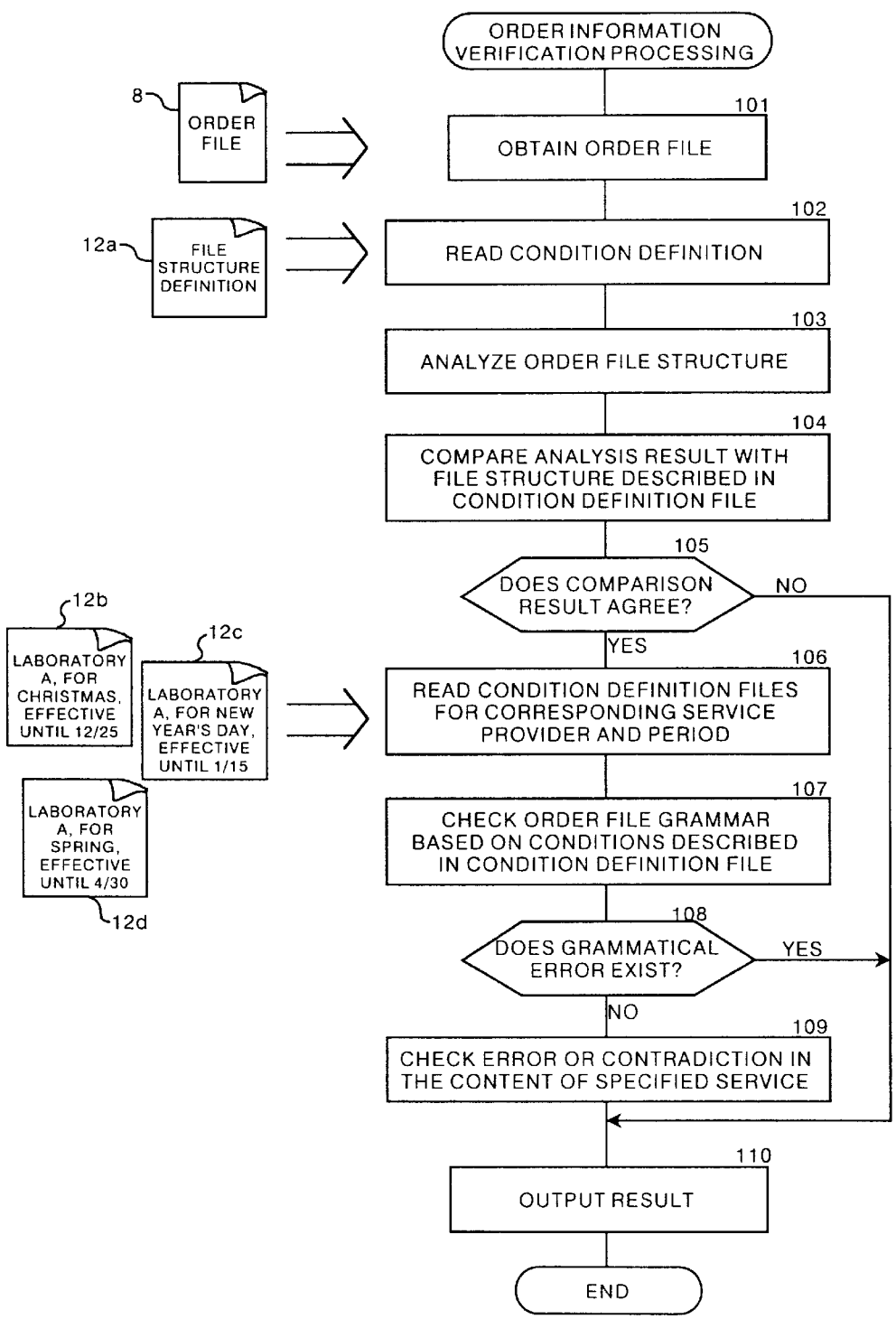

METHOD AND APPARATUS FOR VERIFYING ORDER INFORMATION AND RECORDING MEDIUM STORING ORDER INFORMATION VERIFICATION PROGRAM

BACKGROUND OF THE INVENTION

1. Field of the Invention

The present invention relates to dealing with order information provided from a user to a service provider in the case where printing is ordered in a digital photograph service. More specifically, the present invention relates to a method, an apparatus, and a program for verifying whether or not the order information is in a file acceptable by a system of the service provider, by comparing the structure and the content of the order information with a pre-stored definition.

2. Description of the Related Art

Recently, a digital photograph service which stores and uses a photograph image as digital data has come into service. In a digital photograph service, photographs recorded on a film of a user are recorded as digital data in a recording medium such as a CD-R, or stored in a hard disc of a service provider's system in order to be used for photographic print generation or the like.

A user can place a printing order regarding the stored image data from the service provider by providing order information describing the content of the order via a network or a recording medium. In this case, the system of the service provider obtains this information, analyzes its content, and carries out the printing processing requested by the user.

The order information is generated by a dedicated program installed in a personal computer or the like of the user. Alternatively, the order information may be generated by using an electronic camera, a home game machine, or the like loaded with such a program. This program displays on a screen a list of image data available for printing, or a list of service options (such as print sizes and templates for editing). When the user selects, based on the display, desired image data and a service option by using a mouse, a keyboard, or a button, the program inputs such information and generates a file including order information describing IDs for the selected image data and the service option in a predetermined format.

In such a form of order placement, when the structure of order information is invalid or when the order information has a grammatical error, the system of the service provider cannot carry out the processing requested by the user. Even when there is no grammatical error in the format, it is actually impossible for the system to carry out the requested processing if the content of the order is inappropriate, such as the case of specification of a print size which is too large to be processed by the existing system.

Therefore, a program such as the above needs to prevent generation of invalid order information by verifying the structure and the content of the order information generated by the user. Alternatively, separately from such an order information generating program, an order information verification program needs to be provided so that whether or not the order information generated by the order information generating program is in the form of an appropriate file can be checked.

A program (verifier) for verifying the structure and the content of a file generally retains information defining an appropriate structure and the content of a file. By comparing a file with this definition, the file is judged to be valid or invalid. Therefore, whether the order information is valid or invalid can be judged by comparing the order information with pre-stored information such as the structure and grammar (a description format) of a file including the order information, the available print sizes, and the like.

However, the content of a digital photograph service changes with progress of technology or the needs of users. Therefore, the structure of order information can be changed in accordance with a change in the service.

Furthermore, the content of the service to be provided usually varies depending on each service provider, such as a DPE or a laboratory. Moreover, the content of the service to be provided may change depending on the time of year. For example, the available print sizes change depending on a printer owned by a service provider, and there are some services which are provided in only a limited period, such as generation of new year greeting postcards or the like.

Therefore, the above form of service wherein the order information generating or verifying program retains information regarding definitions of the structure of the order information and the content of an order cannot carry out proper verification unless each service provider uses a different program in each service period of a year.

However, generating and replacing programs is a burden for both a service provider and a user. Based on consideration of the above problems, the present invention aims to provide an easier order information verifying method and apparatus as well as a program which verifies order information.

SUMMARY OF THE INVENTION

In order to solve the above problems, the present invention manages definition information defining conditions to be satisfied by order information as an individual replaceable file.

In other words, the order information verifying method of the present invention verifies order information describing the content of an order for a predetermined service as digital data, and comprises the steps of:

pre-storing, as digital data in a predetermined recording medium, one or a plurality of condition definition files describing conditions to be satisfied by order information;

obtaining order information to be verified;

reading at least one of the condition definition files from the recording medium;

verifying whether or not the obtained order information satisfies each condition described in the condition definition file having been read; and outputting a result of verification to a display medium and/or a recording medium.

The "order information" may be a text file describing only the content of an order, or an independent file of another form. The order information may also be attached to an image file (embedded as a portion of header information of the image file), for example.

The "conditions to be satisfied by the order information" means structural conditions to be satisfied by an order file containing the order information therein (or an image file having order information embedded therein), for example. The structural conditions means whether or not a file has an appropriate file-name extension and file header, for example. When a file has a hierarchy structure comprising a plurality of storages and streams, such as an OLE structure, whether or not the file has a necessary storage or stream is also regarded as a structural condition.

Furthermore, the "conditions to be satisfied by the order information" includes conditions to be satisfied by each data item composing the order information, and conditions regarding a relation between the data items, for example.

The "conditions to be satisfied by each data item composing the order information" means a data type of each item, for example.

The "conditions regarding a relation between the data items" mean a condition such that a value describing the number of prints needs to be described in a data item specifying the quantity when a value indicating a printing service is described in a data item specifying the kind of service (that is, when printing is ordered, the quantity of prints needs to be specified), for example.

When a plurality of condition definition files are recorded in a recording medium, a condition definition file having a condition contradictory to that in another file may be recorded so that the condition definition files can be used properly depending on a purpose. Alternatively, condition definition files classified by the kind of conditions, such as a condition definition file defining a file structure and a condition definition file defining data items, may be provided so that verification is carried out by referring to those condition definition files.

Furthermore, when the content of the predetermined service is decided by the time of year, a condition definition file for each service period may be recorded in the recording medium and the verification is carried out by reading from the recording medium the condition definition file corresponding to the time at which an order is placed.

Likewise, when the content of the predetermined service is decided by each service provider, a condition definition file for each service provider may be recorded in the recording medium so that the verification can be carried out by reading from the recording medium the condition definition file for the service provider which receives the order information.

The result of the verification may be shown as a mere judgment result such as "valid" or "invalid". However, information indicating whether or not each condition has been satisfied may be output for each condition, such as "the file structure is valid, the print size is invalid". Furthermore, for a condition which has not been satisfied, information indicating violation of the condition, such as "a print size is not specified in the printing order", may be output as well.

The verification result may be displayed on a display medium such as a monitor or the like belonging to a system, or output on paper by a printer. Alternatively, the result may be output to both the monitor and the paper.

The order information verifying method of the present invention has been explained in the above. An order information verifying apparatus of the present invention thus verifies order information according to the above method.

In other words, the order information verifying apparatus verifies order information describing the content of an order for a predetermined service as digital data, and comprises:
 a recording medium for storing one or a plurality of condition definition files describing, as digital data, conditions to be satisfied by order information;
 order information obtaining means for obtaining order information to be verified;
 condition reading means for reading from the recording medium at least one of the condition definition files;
 verifying means for verifying whether or not the obtained order information satisfies each condition described in the condition definition file having been read; and
 result outputting means for outputting a result of verification to a display medium and/or a recording medium.

More specifically, the order information verifying apparatus of the present invention can be realized as an apparatus dedicated for the verification or as an apparatus comprising functions for generating and verifying order information, and may be installed at a counter of a service provider. Alternatively, if the order information verifying apparatus is realized as a digital camera comprising the order information generating and verifying functions, a user can carry out the verification.

As has been described above, the condition definition file describes conditions for a file structure, each data item of order information, and a relationship between the data items, for example.

In the case where a condition definition file for each service period is generated, the condition reading means judges the time of order placement by using the date of generation or reception of the order information, and the condition definition file for the service period corresponding to the time is read from the recording medium.

Likewise, in the case where a condition definition file for each service provider is generated, the condition reading means reads from the recording medium the condition definition file for the service provider which receives the order information. The "service provider which receives the order information" means the service provider specified at the time of order information generation in the case where the order information verifying apparatus is installed on the user side, while it means the service provider having the order information verifying apparatus in the case where the order information verifying apparatus is installed on the service provider side.

It is preferable for the result outputting means to output information indicating whether or not each condition has been met, and also information showing each violation of a condition which has not been satisfied.

A program recorded in a recording medium of the present invention carries out verification processing according to the above verification method.

In other words, the program verifies order information describing as digital data the content of an order for a predetermined service, and causes a computer to execute order information obtaining processing wherein order information to be verified is obtained;
 condition reading processing wherein at least one condition definition file is read from a recording medium storing one or a plurality of condition definition files describing, as digital data, conditions to be satisfied by order information;
 verification processing wherein whether or not each condition described in the condition definition file is satisfied by the order information having been obtained is verified; and
 result output processing wherein a result of verification is output to a display medium and/or a recording medium.

As has been described above, the condition definition file is assumed to have conditions for a file structure, each data item composing order information, and a relationship between the data items, for example.

In the case where a condition definition file for each service period is generated, the time of order placement is judged in the condition reading processing by using the date of generation or reception of the order information, and the condition definition file for the service period corresponding to the time is read from the recording medium.

Likewise, in the case where a condition definition file for each service provider is generated, the condition definition file for the service provider which receives the order information is read from the recording medium in the condition reading processing.

It is preferable for information indicating whether or not each condition has been met and information showing each violation of the condition which is described in the condition definition file and has not been satisfied to be output in the result output processing.

The order information verifying method and apparatus of the present invention, and the program recorded in the recording medium retain conditions to be satisfied by order information not as fixed information but in a file which can be dealt with independently, and refers to the file in the verification processing. According to the present invention, by managing conditions to be satisfied by order information (a file structure, a data type, for example) in the form of a file, the definition information can be replaced more easily and a flexible response is possible when a format of the order information or the content of a service changes.

Furthermore, by providing a condition definition file for each service period or service provider, the case where a different service is provided depending on the time or a service provider can be dealt with.

Moreover, upon outputting the verification result, if whether or not each condition is met is indicated and a list of violations is provided, it is easier for a user or an operator to change the order information when the order information has been found to be invalid.

BRIEF DESCRIPTION OF THE DRAWINGS

FIG. 3 is a flow-chart showing an example of order information verification processing.

DESCRIPTION OF THE PREFERRED EMBODIMENTS

Figure 1:
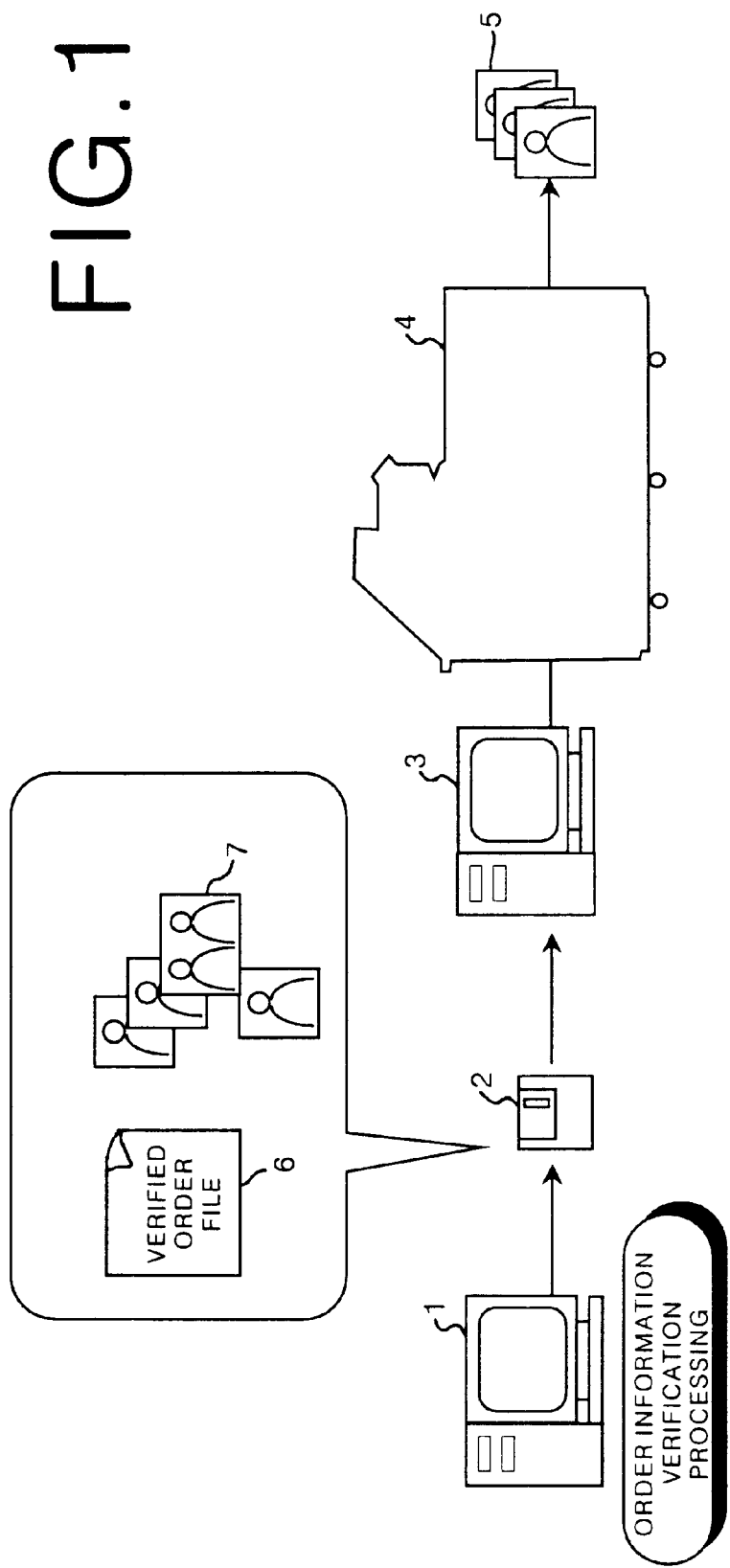
FIG. 1 is an illustration showing an example of a structure of a digital photograph service.

Hereinafter, embodiments of the present invention will be explained with reference to the accompanying drawings. FIG. 1 shows a form of a service wherein an order information verification program is installed in a personal computer of a user so that the user can verify order information, and a system of a service provider provides a service based on the order information having been verified. The order information is assumed to be recorded in an independent file (hereinafter called an order file) other than a file storing an image.

In FIG. 1, a personal computer 1 is owned by a user and loaded with the order information verification program. A recording medium 2 for order placement is used when the user provides to the service provider an image file 7 as a printing target and an order file 6. An image handling apparatus 3 and a photographic printer 4 belong to the system of the service provider. The image handling apparatus 3 obtains the order file and the image file, carries out image editing or color/tone correction processing according to the content of the order file if necessary, and instructs the printer to output a print. The photographic printer 4 is a known printer for outputting a photographic print 5 based on the input image file and instruction information.

The user generates the order file by carrying out a predetermined operation on the personal computer 1 while using predetermined application software. By running the verification program provided as a function of the application software or as a separate program installed in the personal computer 1, the user verifies the order file having been generated. This verification processing may be carried out automatically on the generated order file, regardless of the user's intention.

Figure 2:
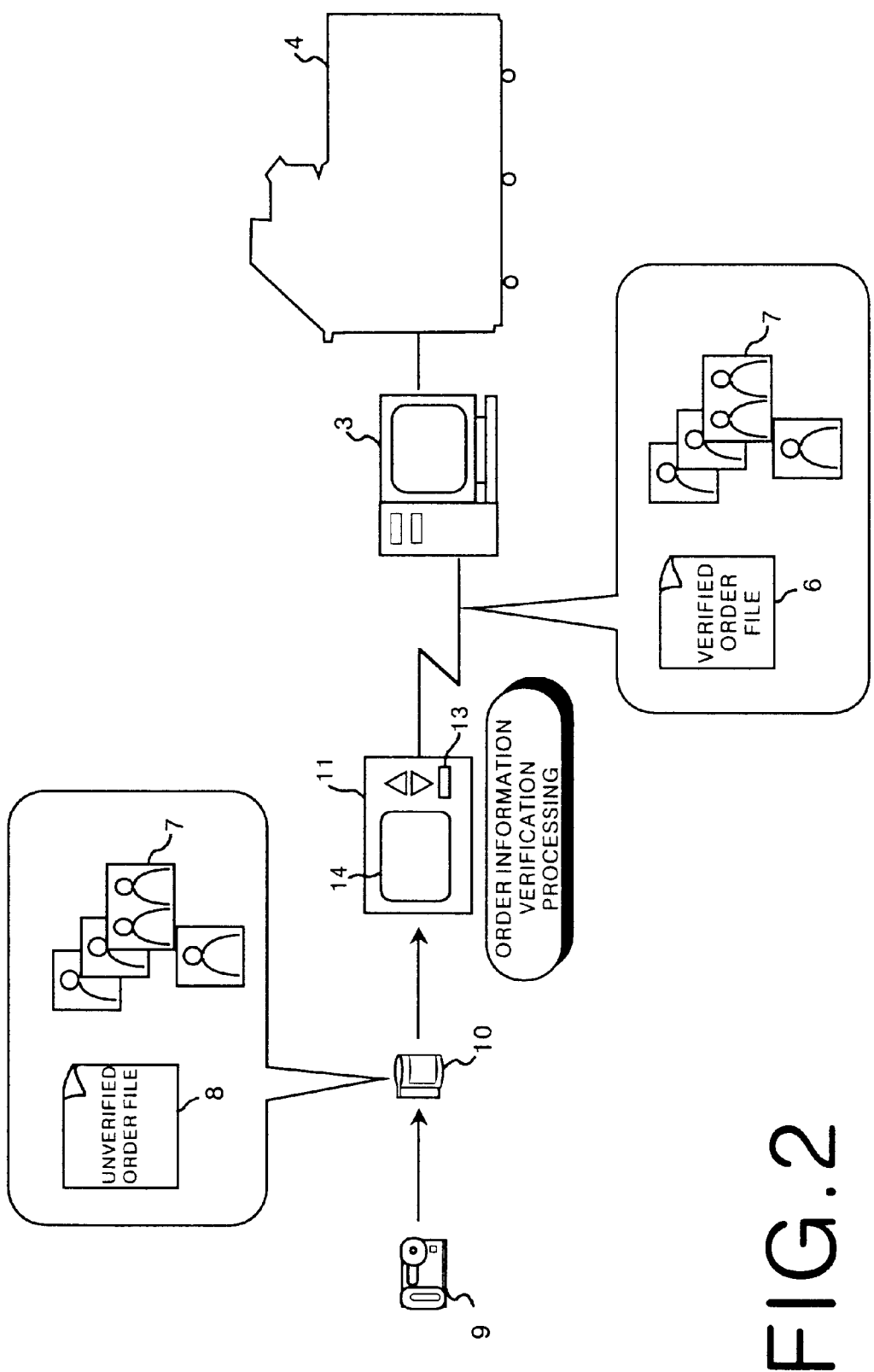
FIG. 2 is an illustration showing another example of a structure of a digital photograph service.

FIG. 2 shows a form of the service wherein an order information verifying apparatus of the present invention is realized as a dedicated terminal 11 installed at a service provider and verification processing is carried out by the service provider on an unverified order file 8 recorded in a recording medium 10 brought in by a user.

In FIG. 2, a digital camera 9 comprises an order information generating function. The quantity of prints or the like can be specified while a photographed image is being replayed on a liquid crystal display monitor attached to the digital camera. The order information having been specified is recorded as the order file 8 in a removable recording medium 10 for the digital camera (such as an SSFDC, a Compact Flash, or a PC card), together with the image file 7.

The order file 8, as well as the image file 7 recorded in the recording medium 10, are obtained by the dedicated terminal 11. The dedicated terminal 11 is a small-size apparatus comprising a medium reading unit 13 for reading the removable recording medium 10, a display unit 14 for outputting a verification result, a ROM wherein the program has been recorded, a COU for carrying out the processing, a memory, and data transferring means for transferring the order file having been verified to the image handling apparatus 3.

In the embodiment shown in FIG. 2, the image handling apparatus 3 and the photographic printer 4 may be installed in a laboratory while the dedicated terminal 11 may be installed at a service provider having no output equipment (for example, a DPE located in a station concourse). The dedicated terminal 11 and the image handling apparatus 3 are connected by a dedicated line or via the Internet. The verification processing may be carried out on the order file brought in by the user at the counter of the service provider so that the order file 6 after verification can be transferred to the image handling apparatus 3 only when the order file is valid. Alternatively, the dedicated terminal 11 may be loaded with an order information generating program so that an order file can be corrected immediately on site when the order file is invalid.

The processing to be carried out by the order information verification program installed in the personal computer 1 or the dedicated terminal 11 in the form of the service shown in FIGS. 1 or 2 will be explained next.

FIG. 3 shows an example of the order information verification processing. In this example, a condition definition file 12a defining structural conditions to be satisfied by the order file, and condition definition files 12b, 12c, and 12d defining the content of the service for each service period (conditions of an available service) provided by two service providers, namely laboratories A and B, are stored in an apparatus to carry out the verification processing. In the embodiment shown in FIG. 1, the condition definition files 12 are installed in a hard disc of the personal computer 1 upon installation of the verification program. In the embodiment shown in FIG. 2, the condition definition files 12 may be stored in the ROM together with the verification program. However, it is preferable for the condition definition files to be stored in removable recording media so that the condition definition files can be replaced easily by changing the removable recording media.

In the embodiment of the present invention, the format of the file structure is common among the service providers.

Therefore, the condition definition file 12a defining the file structure is provided as a file separated from the condition definition files 12b, 12c, and 12d defining the service content. In other words, the verification is carried out by referring to two condition definition files, namely the condition definition file 12a and any one of condition definition files 12b, 12c, and 12d. However, the definition regarding the file structure may be described in each condition definition file for each service provider so that the verification processing can be carried out by referring to only one condition definition file. Alternatively, the conditions to be satisfied by order information may be classified in further detail and described in more condition definition files.

As shown in FIG. 3, the verification program in this embodiment obtains the order file 8 and the condition definition file 12a first (Steps 101 and 102). The verification program then analyzes the structure of the order file (Step 103), compares the analysis result with the file structure described in the condition definition file 12a (Step 104), and judges whether or not the two agree (Step 105). When the comparison result shows a disagreement, the file structure is judged to be invalid and a message such as "file format error" is output to the monitor or the like (Step 110).

When the comparison result shows an agreement, a service provider code described in the order file 8 is read and the date of the verification is obtained from the system. The condition definition file corresponding to the service provider and the service period (any one of the condition definition files 12b, 12c, and 12d) is read (Step 106), and grammar of the order file is checked according to the conditions described in the condition definition file (Step 107). Whether or not a grammatical error exists is judged (Step 108), and if there is such as an error, a message such as "grammatical error: different data type" is output to the monitor or the like (Step 110).

When no grammatical error is found, whether or not the content of the service (such as a print size) described in the order file is wrong (that is, whether or not the service can be provided by the specified service provider and in the specified service period), and whether or not the content described in the order file is contradictory are checked (Step 109).

When a condition regarding a data item or whether or not a relationship between data items is proper is checked, it is preferable for the verification program to check not only the description in the order file but also the content of another file if necessary. For example, when a JPEG format file has been specified as an image file to be printed, it is preferable for the verification program to check in Step 109 whether or not the corresponding JPEG format file exists in the recording medium brought in by the user.

When no error or contradiction has been detected in Step 109, a message or the like indicating that the order file is valid is displayed on the monitor. When an error or contradiction has been found in Step 109, a message indicating that the order file is invalid and a list of detected violations are output on the monitor (Step 110).

In the example described in the above, the verification is carried out by reading any one of condition definition files 12b, 12c, or 12d. However, a verification method wherein all of 3 condition definition files are read is also possible. In this case, the order file 8 does not need to have the service provider code therein.

The verification program sequentially compares the content described in the order file 8 with the condition definition files 12b, 12c and 12d. When the order file is judged to be valid by using any one of the condition definition files, the service provider's name and the service period corresponding to the condition definition file are displayed on the monitor or the like. More specifically, when the order file 8 contains an order for a Christmas card having a photograph printed therein for example, a message such as "valid only when the order is placed from the laboratory A by December 25" is output. When there is no condition definition file by which the order file is judged to be valid, a message indicating that the order file 8 is invalid is also output, as in the above example.

A method of describing the condition definition file will be explained next referring to an example. The example shown below defines 3 description rules, namely rules regarding a file structure definition, each data item (property) included in the order file, and a relationship between the data items. According to these rules, the conditions are described. The condition definition file is assumed to have a hierarchy structure comprising a storage and a stream.

Table 1 shows a description rule regarding the file structure definition. "{ }" means that anyone included therein is described. "[ ]" means that the item therein is not necessarily described. According to the description rule in Table 1, the name of a file component (storage or stream name), the kind of the component, whether or not the component is required, and whether or not a plurality of the components may exist are defined.

TABLE 1 storage stream structure storage or stream name = {Storage | Stream}, {Required | Option}, [one]

| | |
|---|---|
| Storage or Stream name | :the name of a storage or stream |
| {Storage | Stream} | :indicating whether the component is storage or stream |
| {Required | Option} | :indicating whether the component is required or optional |
| [one] | :indicating the another storage or stream having the same name cannot exist in the order file |

Table 2 shows an example of a file structure definition described according to the description rule in Table 1. It defines a condition that "a storage named Root is required and no other storages having the same name can exist in the file".

[Table 2]

Storage Stream Structure

Root=Storage, Required, one

Table 3 shows the description rule regarding a definition of each data item included in the order file. As the data item included in the order file, items such as the name and address of a user and the kind of service are included. According to the description rule in Table 3, for each data item, the name of the data item (Property name), whether or not it is required, the type of the data item (Type), a value to be selected therefor (Choices), the kind of characters (Character Set) used in the description (for example, whether or not it may include a Chinese Character), and the length of the character string (Character Length) can be defined.

TABLE 3

Property

Property name ={Required | Option}, Type,
[Choices1, Choices2, . . . , Character Set,
Character Length]

| | |
|---|---|
| Property name | the name of the property |
| {Required | Option} | indicating whether or not the property is required or optional |
| Type | an acceptable data type |
| Choices | available values when the property value is selected from the choices |
| Character Set | an acceptable character set when the data type is character string |
| Character Length | the length of the character string when the data type is character string |

Table 4 shows an example of a definition described according to the description rule in Table 3. For example, the definition in line 1 means a condition that "a property named Product Class is required and the property needs to be described as data in UI type which takes any one of the values 0x00, 0x01, 0x02, or 0x03". The definition in line 2 is a condition that "the property named Username may not exist, and the property needs to be described as data in VT_LPWSTR type using only the characters defined in the Character Set1 having a length of less than 40 characters if the property exists". In this example, Product Class is a data item indicating the type of service (printing, output to a recording medium, image registration, or the like), and Username describes the name of a user.

[Table 4]
Property

Product Class=Required, UI, {0x00|0x01|0x02|0x03}
UserName=Option, VT_LPWSTR, CharacterSet1, length<40

Table 5 below shows a description rule regarding a definition of a relation between the data items (properties).

TABLE 5

Condition

If [Storage:Stream:]Property Name =
{Property Data | Exist | Not_Exist }
Then [Storage:Stream:]Property Name =
{Required | Non | Optional}, [Choices]

{Property Data | Exist | Not_Exist}

| | |
|---|---|
| Property Data | when the property has a special value |
| Exist | when the property exists |
| Not_Exist | when the property does not exist |
| {Required | Non | Optional} | |
| Required | when the property is required |
| Non | when the property cannot exist |
| Optional | when the property may exist |
| Choices | available values when the property value is selected from the choices |

Table 6 shows an example of a definition described according to the description rule in Table 5. For example, the definition in lines 1 and 2 describes a condition that "when 0x02 is specified as the value for Product Class property, Destination Media Type property needs to be described". As has been described in the above example, Product Class property specifies the kind of service, and 0x02 means an output service to a recording medium in this example. Destination Media Type property specifies the kind of recording medium to which data are output. In other words, the above definition defines a condition that "in an order for data to be output to a recording medium, the kind of recording medium needs to be described". The definition in line 3 of Table 6 defines that an nth image (ImageN) is necessary when image data (Image) to be used for print output are the nth image data in the order file.

TABLE 6

Condition

If Product Class = 0x02
   then Destination Media Type = Required
If Image = N then ImageN = Required According to the description rule in Table 5, various kinds of relationships between the data items can be defined, such as "quantity specification is necessary in the case of a printing order", "no specification of vertical or horizontal length is allowed when a print size is chosen from standard sizes (L size, A4 size, and the like)", and "YMCK data specification is not allowed for a file containing only RGB data".

As has been described in the above, since management and replacement of definition information is easy according to the present invention, a more flexible response to a change in an order information format or in the content of service is realized.

What is claimed is:

1. An order information verifying method for verifying order information describing the content of an order for an image processing service as digital data, the method comprising the steps of:

pre-storing, as digital data in a predetermined recording medium, one or more of a plurality of condition definition files describing conditions to be satisfied by order information;

obtaining order information, at least specifying how to process image data, to be verified;

reading at least one of the condition definition files from the recording medium;

verifying whether or not the obtained order information satisfies each of the conditions described in the condition definition file;

outputting a result of verification to one or more of a display medium and a recording medium; and establishing a plurality of service periods during which the order for a predetermined service can be placed, a condition definition file for each of the plurality of service periods is recorded in the recording medium when the content of the predetermined service is decided by each service period, and wherein the step of verifying is performed by reading from the recording medium the condition definition file corresponding to the service period in which the order is placed.

2. An order information verifying method for verifying order information describing the content of an order for an image processing service as digital data, the method comprising the steps of:

pre-storing, as digital data in a predetermined recording medium, one or more of a plurality of condition definition files describing conditions to be satisfied by order information;

obtaining order information, at least specifying how to process image data, to be verified;

reading at least one of the condition definition files from the recording medium;

verifying whether or not the obtained order information satisfies each of the conditions described in the condition definition file; and outputting a result of verification to one or more of a display medium and a recording medium, wherein a condition definition file for each of a service provider is recorded in the recording medium when the content of the predetermined service is decided by each service provider, and the verification can be carried out by reading from the recording medium the condition definition file for the service provider which receives the order information.

3. An order information verifying apparatus for verifying order information describing the content of an order for an image processing service as digital data, the order information verifying apparatus comprising:

a recording medium storing one or a plurality of condition definition files describing, as digital data, conditions to be satisfied by order information;

order information obtaining means for obtaining order information, at least specifying how to process image data, to be verified;

condition reading means for reading from the recording medium at least one of the condition definition files;

verifying means for verifying whether or not the obtained order information satisfies each of the conditions described in the condition definition file having been read; and result outputting means for outputting a result of verification to one or more of a display medium and a recording medium, wherein a plurality of service periods is established in which the order for a predetermined service can be placed and wherein the recording medium stores a condition definition file for each of the plurality of service periods, and the condition reading means reads from the recording medium the condition definition file corresponding to the service period in which the order is placed.

4. An order information verifying apparatus for verifying order information describing the content of an order for an image processing service as digital data, the order information verifying apparatus comprising:

a recording medium storing one or a plurality of condition definition files describing, as digital data, conditions to be satisfied by order information;

order information obtaining means for obtaining order information, at least specifying how to process image data, to be verified;

condition reading means for reading from the recording medium at least one of the condition definition files;

verifying means for verifying whether or not the obtained order information satisfies each of the conditions described in the condition definition file having been read; and result outputting means for outputting a result of verification to one or more of a display medium and a recording medium, wherein the recording medium stores a condition definition file for each of a service provider, and the condition reading means reads from the recording medium the condition definition file for the service provider which receives the order information.

5. A computer-readable recording medium storing a program for verifying order information describing the content of an order for an image processing service as digital data, the program causing a computer to execute:

order information obtaining processing wherein order information, at least specifying how to process image data, to be verified is obtained;

condition reading processing wherein, from a recording medium storing one or a plurality of condition definition files describing, as digital data, conditions to be satisfied by order information, the condition definition file or at least one of the condition definition files is read;

verification processing wherein whether or not each of the conditions described in the condition definition file has been satisfied by the order information having been obtained is verified; and result output processing wherein a result of verification is output to a one or more of display medium and a recording medium, wherein a plurality of service periods is established in which the order for a predetermined service can be placed and wherein the recording medium stores a condition definition file for each of the plurality of service periods, and the condition reading processing is processing wherein the condition definition file corresponding to the service period in which the order is placed is read from the recording medium.

6. A computer-readable recording medium storing a program for verifying order information describing the content of an order for an image processing service as digital data, the program causing a computer to execute:

order information obtaining processing wherein order information, at least specifying how to process image data, to be verified is obtained;

condition reading processing wherein, from a recording medium storing one or a plurality of condition definition files describing, as digital data, conditions to be satisfied by order information, the condition definition file or at least one of the condition definition files is read;

verification processing wherein whether or not each of the conditions described in the condition definition file has been satisfied by the order information having been obtained is verified; and result output processing wherein a result of verification is output to a one or more of display medium and a recording medium, wherein the recording medium stores the condition definition file for each of a service provider, and the condition reading processing is processing wherein the condition definition file for the service provider which receives the order information is read from the recording medium.

7. A system for verifying order information describing the content of an order for an image processing service as digital data, the system comprising:

a recording medium having a plurality of condition definition files describing as digital data conditions to be satisfied by order information stored thereon; and a processor coupled to the recording medium, the processor configured to, obtain order information, that at least specifies how to process image data, to be verified, read at least one of the condition definition files from the recording medium, verify whether the obtained order information satisfies each of the conditions described in the condition definition file, and output a result of verification to the recording medium, wherein the processor is further configured to:

establish a plurality of service periods in which the order for a predetermined service can be placed; the recording medium storing a condition definition file for each of the plurality of service periods; and read from the recording medium the condition definition file corresponding to the service period in which the order is placed.

8. A system for verifying order information describing the content of an order for an image processing service as digital data, the system comprising:

a recording medium having a plurality of condition definition files describing as digital data conditions to be satisfied by order information stored thereon; and a processor coupled to the recording medium, the processor configured to, obtain order information, that at least specifies how to process image data, to be verified, read at least one of the condition definition files from the recording medium, verify whether the obtained order information satisfies each of the conditions described in the condition definition file, and output a result of verification to the recording medium, wherein the recording medium further stores a condition definition file for each of a plurality of service providers and wherein the processor is further configured to read from the recording medium the condition definition file for the service provider which receives the order information.

9. A method for providing valid order information describing a content of an order for an image processing service as digital data, comprising:

pre-storing, as digital data in a predetermined recording medium, one or more of a plurality of condition definition files describing conditions to be satisfied by the order information;

reading at least one of the condition definition files from the recording medium;

selecting from amongst the at least one condition definition files the order information corresponding to an acceptable range specified by the condition definition files; and recording the selected order information.

10. An order information apparatus for providing valid order information describing the content of an order for an image processing service as digital data, the order information apparatus comprising:

a recording medium for pre-storing one or a plurality of condition definition files describing, as digital data, conditions to be satisfied by order information;

condition reading means for reading from the recording medium at least one of the condition definition files;

selection means for selecting from amongst the at least one condition definition files the order information corresponding to an acceptable range specified by the condition definition files; and recording means for recording the selected order information.

11. A computer-readable recording medium storing a program for providing valid order information describing the content of an order for an image processing service as digital data, the program causing a computer to execute:

condition reading processing wherein, from a recording medium pre-storing one or a plurality of condition definition files describing, as digital data, conditions to be satisfied by order information, the condition definition file or at least one of the condition definition files is read;

selection processing wherein order information corresponding to an acceptable range specified by the condition definition files is selected from amongst the at least one condition definition files; and recording processing wherein the selected order information is recorded in a recording medium.

12. A system for providing valid order information describing the content of an order for an image processing service as digital data, the system comprising:

a recording medium having a plurality of pre-stored condition definition files describing, as digital data, conditions to be satisfied by order information; and a processor coupled to the recording medium, the processor configured to, read at least one of the condition definition files from the recording medium, select from amongst the at least one condition definition files an acceptable range specified corresponding to order information desired; and record the selected order information in a recording medium.

13. A method for searching for a service provider capable of offering an image processing service of a specific type, comprising:

obtaining order information describing a content of an order for the image processing service of the specific type as digital data;

reading a condition definition file containing information on a correlation between a plurality of image processing services and service providers capable of offering the image processing services;

verifying whether or not each of the service providers is capable of offering the image processing service specified by the obtained information by comparing the obtained order information with the information contained in the condition definition file; and outputting a result of verification to one or more of a display medium or a recording medium.

14. An apparatus for searching for a service provider capable of offering an image processing service of a specific type, comprising:

order information obtaining means for obtaining order information describing a content of an order for the image processing service of the specific type as digital data;

condition reading means for reading a condition definition file containing information on a correlation between a plurality of image processing services and service providers capable of offering the image processing services;

verification means for verifying whether or not each of the service providers is capable of offering the image processing service specified by the obtained information by comparing the obtained order information with the information contained in the condition definition file; and result outputting means for outputting a result of verification to one or more of a display medium or a recording medium.

15. A computer-readable recording medium storing a program for searching for a service provider capable of offering an image processing service of an specific type, the program causing a computer to execute:

order information obtaining processing wherein order information describing a content of an order for the image processing service of the specific type as digital data is obtained;

condition reading processing wherein, from a recording medium storing one or a plurality of condition definition files containing information on a correlation between a plurality of image processing services and service providers capable of offering the image processing services, the condition definition file or at least one of the condition definition files is read;

verification processing wherein whether or not each of the service providers is capable of offering the image processing service specified by the obtained information by comparing the obtained order information with the information contained in the condition definition file is verified; and result output processing wherein a result of verification is output to one or more of a display medium or a recording medium.

16. A system for searching for a service provider capable of offering an image processing service of a specific type, comprising:

a recording medium having a plurality of condition definition files containing as digital data information on a correlation between a plurality of image processing services and service providers capable of offering the image processing services; and a processor coupled to the recording medium, the processor configured to, obtain order information describing a content of an order for the image processing service of the specific type as digital data;

read at least one of the condition definition files containing information on a correlation between a plurality of image processing services and service providers capable of offering the image processing services;

verify whether or not each of the service providers is capable of offering the image processing service specified by the obtained information by comparing the obtained order information with the information contained in the condition definition file; and output a result of verification to one or more of a display medium or a recording medium.

* * * * *